United States Patent
Duan et al.

(10) Patent No.: US 9,516,114 B2
(45) Date of Patent: Dec. 6, 2016

(54) DATA PACKET TRANSMISSION METHOD AND RELATED DEVICE AND SYSTEM

(71) Applicant: Huawei Technologies Co., Ltd., Shenzhen (CN)

(72) Inventors: Kebo Duan, Beijing (CN); Wenshu Xiao, Beijing (CN); Shu Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 450 days.

(21) Appl. No.: 14/028,183

(22) Filed: Sep. 16, 2013

(65) Prior Publication Data

US 2014/0122732 A1    May 1, 2014

(30) Foreign Application Priority Data

Oct. 31, 2012    (CN) .......................... 2012 1 0427670

(51) Int. Cl.
G06F 15/16    (2006.01)
*H04L 29/08*    (2006.01)
*H04L 29/06*    (2006.01)

(52) U.S. Cl.
CPC ............. *H04L 67/14* (2013.01); *H04L 69/163* (2013.01); *H04L 29/06* (2013.01); *H04L 29/08* (2013.01)

(58) Field of Classification Search
None
See application file for complete search history.

(56) References Cited

U.S. PATENT DOCUMENTS

| 2003/0014624 A1* | 1/2003 | Maturana ................ H04L 29/06 713/151 |
| 2003/0123481 A1 | 7/2003 | Neale et al. |
| 2003/0236841 A1* | 12/2003 | Epshteyn ................ H04L 69/16 709/206 |
| 2008/0104285 A1* | 5/2008 | Xiong ................. G06F 11/3041 710/15 |
| 2008/0220741 A1* | 9/2008 | Hung .................... H04W 12/06 455/411 |
| 2011/0141904 A1 | 6/2011 | Viger et al. |

(Continued)

FOREIGN PATENT DOCUMENTS

CN    101262670 A    9/2008
CN    102664804 A    9/2012

OTHER PUBLICATIONS

Border, et al., "Performance Enhancing Proxies Intended to Mitigate Link-Related Degradations," Network Working Group, Jun. 2001, 46 pages.

(Continued)

*Primary Examiner* — Viet Vu
*Assistant Examiner* — James Edwards
(74) *Attorney, Agent, or Firm* — Slater Matsil, LLP

(57) ABSTRACT

Embodiments of the present disclosure relate to the field of computer networks, and disclose a data packet transmission method and a related device and system. In the method, a traditional communication protocol (such as TCP) handshake process is optimized, so that data packet transmission may be implemented in the handshake process. The data packet transmission does not depend on completion of the handshake, thereby effectively reducing a data packet transmission delay caused by an RTT delay existing in the handshake process.

4 Claims, 7 Drawing Sheets

(56) References Cited

U.S. PATENT DOCUMENTS

2011/0264905 A1* 10/2011 Ovsiannikov ..... H04L 29/08792
 713/151
2013/0107794 A1* 5/2013 Yamada ................ H04W 48/18
 370/315

OTHER PUBLICATIONS

Ladiwala, et al., "Transparent TCP acceleration," Computer Communications 32 (2009), Available online Dec. 7, 2008, 12 pages.
Wang, Z., "Research of Network Security Based on the Embedded Operating System," Degree-Conferring-Institute: Harbin Institute of Technology, Dec. 2008, 38 pages.
Zhang, W.; "Research and Application of data Acquisition and Transmission System Based on SSL Protocol," Dec. 15, 2005, pp. 1-39.

* cited by examiner

DATA PACKET TRANSMISSION METHOD AND RELATED DEVICE AND SYSTEM

CROSS-REFERENCE TO RELATED APPLICATION

This application claims priority to Chinese Patent Application No. 201210427670.2, filed on Oct. 31, 2012, which is hereby incorporated by reference in its entirety.

TECHNICAL FIELD

The present disclosure relates to the field of computer networks, and in particular, to a data packet transmission method and a related device and system.

BACKGROUND

Nowadays, computer networks are increasingly applied more and more deeply and widely, communication between people is no longer limited by a region and a distance. However, after a relatively long distance is spanned, a network delay is obviously increased. Such delay mainly includes a delay for transmitting a data packet on a network, a delay for a data packet to wait in a queue and be processed on a transmission device (such as a router), and so on. A delay for transmitting a data packet on a wide area network (Wide Area Network, WAN) may reach tens of or even hundreds of milliseconds.

In an actual application, data packet transmission can be started only after a transport control protocol (Transport Control Protocol, TCP) handshake process is undergone. The TCP handshake process is as shown in FIG. 1, and includes the following steps: Step (1): A client sends a server a handshake request packet carrying transmission parameters that need to be negotiated, where the parameters that need to be negotiated and are carried in the handshake request packet sent by the client include parameters such as an initial sequence number (Initial Sequence Number, ISN) and a maximum segment size (Maximum Segment Size, MSS) of the packet sent by the client and a receive window size of the client; step (2): After receiving the handshake request packet of the client, the server sends the client a handshake response packet carrying negotiated parameters, where the negotiated parameters carried in the handshake response packet sent by the server include parameters such as an ISN and a maximum segment size MSS of the packet sent by the server and a receive window size of the server, and both negotiated parameters SYN and ACK carried in the handshake response packet sent by the server are set to 1, indicating that the handshake request packet sent by the client has been received by the server; step (3): After receiving the handshake response packet sent by the server, the client sends an acknowledgement response packet (a carried ACK is set to 1, indicating that the client has received the handshake response packet of the server) to the server, thereby completing the TCP handshake process, so that data packet transmission may be started between the client and the server.

It can be known from the foregoing description that, a data packet can be transmitted only after a TCP handshake process is completed. However, in the TCP handshake process, a round-trip time (Round-Trip Time, RTT) delay of a packet on a network also exists, and a data packet transmission delay may be significantly increased due to existence of the RTT delay.

SUMMARY

Embodiments of the present disclosure provide a data packet transmission method and a related device and system, which can effectively reduce a data packet transmission delay.

A first aspect of the present disclosure provides a data packet transmission method, including:

receiving, by a first terminal, a handshake request packet that is sent by a second terminal and carries an address and a session identifier of the second terminal and parameters that need to be negotiated;

storing, by the first terminal, a mapping between the address and the session identifier of the second terminal that are carried in the handshake request packet and a certain session identifier of the first terminal, where the session identifier of the second terminal that is carried in the handshake request packet and the certain session identifier of the first terminal are used to represent a session connection passing through the second terminal and the first terminal; and sending, by the first terminal, the second terminal a handshake response packet carrying the certain session identifier of the first terminal and negotiated parameters, so that the second terminal transmits a data packet to the first terminal according to the negotiated parameters through the session connection represented by using the session identifier of the second terminal and the certain session identifier of the first terminal.

In a first possible implementation manner of the first aspect of the present disclosure, the method further includes:

receiving, by the first terminal, the data packet transmitted by the second terminal, and querying whether the mapping between the address and the session identifier of the second terminal that are carried in the data packet and the certain session identifier of the first terminal is stored; and if the mapping is stored, transmitting, by the first terminal, through the session connection represented by using the session identifier of the second terminal and the certain session identifier of the first terminal, the data packet to an upper-layer device for processing.

In combination with the first possible implementation manner of the first aspect of the present disclosure, in a second possible implementation manner of the first aspect of the present disclosure, the method further includes:

if it is found through querying that the mapping between the address and the session identifier of the second terminal that are carried in the data packet and the certain session identifier of the first terminal is not stored, buffering, by the first terminal, the data packet transmitted by the second terminal.

In combination with the first aspect of the present disclosure, or the first possible implementation manner of the first aspect of the present disclosure, or the second possible implementation manner of the first aspect of the present disclosure, in a third possible implementation manner of the first aspect of the present disclosure, the method further includes:

detecting, by the first terminal, whether storage time of the mapping between the address and the session identifier of the second terminal that are carried in the handshake request packet and the certain session identifier of the first terminal exceeds preset longest handshake time, and if the storage time of the mapping exceeds the preset longest handshake time, deleting the mapping whose storage time exceeds the preset longest handshake time and that is between the address and the session identifier of the second terminal that are carried in the handshake request packet and the certain session identifier of the first terminal.

A second aspect of the present disclosure provides a terminal, including:

a first receiving unit, configured to receive a handshake request packet that is sent by a second terminal and carries an address and a session identifier of the second terminal and parameters that need to be negotiated;

a storing unit, configured to store a mapping between the address and the session identifier of the second terminal that are carried in the handshake request packet and a certain session identifier of the terminal, where the session identifier of the second terminal that is carried in the handshake request packet and the certain session identifier of the terminal are used to represent a session connection passing through the second terminal and the terminal; and a sending unit, configured to send the second terminal a handshake response packet carrying the certain session identifier of the terminal and negotiated parameters, so that the second terminal transmits a data packet to the terminal according to the negotiated parameters through the session connection represented by using the session identifier of the second terminal and the certain session identifier of the terminal.

In a first possible implementation manner of the second aspect of the present disclosure, the terminal further includes:

a second receiving unit, configured to receive the data packet transmitted by the second terminal; and a querying unit, configured to query whether the storing unit stores the mapping between the address and the session identifier of the second terminal that are carried in the data packet and the certain session identifier of the terminal; where:

the sending unit is further configured to, when a query result of the querying unit is yes, transmit, through the session connection represented by using the session identifier of the second terminal and the certain session identifier of the terminal, the data packet to an upper-layer device for processing.

In combination with the first possible implementation manner of the second aspect of the present disclosure, in a second possible implementation manner of the second aspect of the present disclosure, the storing unit is further configured to, when the query result of the querying unit is no, buffer the data packet transmitted by the second terminal.

In combination with the second aspect of the present disclosure, or the first possible implementation manner of the second aspect of the present disclosure, or the second possible implementation manner of the second aspect of the present disclosure, in a third possible implementation manner of the second aspect of the present disclosure, the terminal further includes:

a detecting unit, configured to detect whether storage time of the mapping that is stored by the storing unit and is between the address and the session identifier of the second terminal that are carried in the handshake request packet and the certain session identifier of the terminal exceeds preset longest handshake time, and if the storage time of the mapping exceeds the preset longest handshake time, delete the mapping whose storage time exceeds the preset longest handshake time and that is between the address and the session identifier of the second terminal that are carried in the handshake request packet and the certain session identifier of the terminal.

A third aspect of the present disclosure provides a terminal, including a transmitter, a receiver, a memory, and a processor connecting to the transmitter, the receiver, and the memory, where the memory stores a set of program codes, and the processor is configured to call the program codes stored in the memory to perform the following operations:

receiving a handshake request packet that is sent by a second terminal and carries an address and a session identifier of the second terminal and parameters that need to be negotiated;

storing a mapping between the address and the session identifier of the second terminal that are carried in the handshake request packet and a certain session identifier of the terminal, where the session identifier of the second terminal that is carried in the handshake request packet and the certain session identifier of the terminal are used to represent a session connection passing through the second terminal and the terminal; and sending the second terminal a handshake response packet carrying the certain session identifier of the terminal and negotiated parameters, so that the second terminal transmits a data packet to the terminal according to the negotiated parameters through the session connection represented by using the session identifier of the second terminal and the certain session identifier of the terminal.

In a first possible implementation manner of the third aspect of the present disclosure, the processor further performs the following operations:

receiving the data packet transmitted by the second terminal, and querying whether the mapping between the address and the session identifier of the second terminal that are carried in the data packet and the certain session identifier of the terminal is stored; and if the mapping is stored, transmitting, through the session connection represented by using the session identifier of the second terminal and the certain session identifier of the terminal, the data packet to an upper-layer device for processing.

In combination with the first possible implementation manner of the third aspect of the present disclosure, in a second possible implementation manner of the third aspect of the present disclosure, the processor further performs the following operation:

if it is found through querying that the mapping between the address and the session identifier of the second terminal that are carried in the data packet and the certain session identifier of the terminal is not stored, buffering the data packet transmitted by the second terminal.

In combination with the third aspect of the present disclosure, or the first possible implementation manner of the third aspect of the present disclosure, or the second possible implementation manner of the third aspect of the present disclosure, in a third possible implementation manner of the third aspect of the present disclosure, the processor further performs the following operations:

detecting whether storage time of the mapping between the address and the session identifier of the second terminal that are carried in the handshake request packet and the certain session identifier of the terminal exceeds preset longest handshake time, and if the storage time of the mapping exceeds the preset longest handshake time, deleting the mapping whose storage time exceeds the preset longest handshake time and that is between the address and the session identifier of the second terminal that are carried in the handshake request packet and the certain session identifier of the terminal.

A fourth aspect of the present disclosure provides a data packet transmission system, including a first terminal and a second terminal, where:

the first terminal is configured to receive a handshake request packet that is sent by the second terminal and carries an address and a session identifier of the second terminal and parameters that need to be negotiated, and store a mapping between the address and the session identifier of the second terminal that are carried in the handshake request packet and a certain session identifier of the first terminal, where the session identifier of the second terminal that is carried in the handshake request packet and the certain session identifier of the first terminal are used to represent a session connection passing through the second terminal and the first terminal; send the second terminal a handshake response packet carrying the certain session identifier of the first terminal and negotiated parameters; and receive a data packet transmitted by the second terminal through the session connection represented by using the session identifier of the second terminal and the certain session identifier of the first terminal; and the second terminal is configured to send the first terminal the handshake request packet carrying the address and the session identifier of the second terminal and the parameters that need to be negotiated, receive the handshake response packet that is sent by the first terminal and carries the certain session identifier of the first terminal and the negotiated parameters, and transmit the data packet to the first terminal according to the negotiated parameters through the session connection represented by using the session identifier of the second terminal and the certain session identifier of the first terminal.

In a first possible implementation manner of the fourth aspect of the present disclosure, the second terminal is further configured to send the first terminal a data packet carrying the address and the session identifier of the second terminal; and the first terminal is further configured to receive the data packet transmitted by the second terminal, query whether the address and the session identifier of the second terminal that are carried in the data packet and the certain session identifier of the first terminal are stored, and if it is stored, transmit, through the session connection represented by using the session identifier of the second terminal and the certain session identifier of the first terminal, the data packet to an upper-layer device for processing.

In combination with the first possible implementation manner of the fourth aspect of the present disclosure, in a second possible implementation manner of the fourth aspect of the present disclosure, the first terminal is further configured to, when it is found through querying that the address and the session identifier of the second terminal that are carried in the data packet and the certain session identifier of the first terminal are not stored, buffer the data packet transmitted by the second terminal.

In combination with the fourth aspect of the present disclosure, or the first possible implementation manner of the fourth aspect of the present disclosure, or the second possible implementation manner of the fourth aspect of the present disclosure, in a third possible implementation manner of the fourth aspect of the present disclosure, the first terminal is further configured to detect whether storage time of the mapping between the address and the session identifier of the second terminal that are carried in the handshake request packet and the certain session identifier of the first terminal exceeds preset longest handshake time, and if the storage time of the mapping exceeds the preset longest handshake time, delete the mapping whose storage time exceeds the preset longest handshake time and that is between the address and the session identifier of the second terminal that are carried in the handshake request packet and the certain session identifier of the first terminal.

In the embodiments of the present disclosure, a first terminal receives a handshake request packet that is sent by a second terminal and carries an address and a session identifier of the second terminal and parameters that need to be negotiated, and stores a mapping between the address and the session identifier of the second terminal that are carried in the handshake request packet and a certain session identifier of the first terminal, where the session identifier of the second terminal that is carried in the handshake request packet and the certain session identifier of the first terminal are used to represent a session connection passing through the second terminal and the first terminal. In this case, after sending the handshake request packet, the second terminal may start to send a data packet to the first terminal through the session connection, instead of starting to transmit the data packet after a handshake is completed. It can be seen that, in the embodiments of the present disclosure, a traditional communication protocol (such as TCP) handshake process is optimized, so that data packet transmission may be implemented in the handshake process; and the data packet transmission does not depend on completion of the handshake, thereby effectively reducing a data packet transmission delay caused by an RTT delay existing in the handshake process.

BRIEF DESCRIPTION OF DRAWINGS

To illustrate the technical solutions in the embodiments of the present disclosure or in the prior art more clearly, the following briefly introduces accompanying drawings required for describing the embodiments. Apparently, the accompanying drawings in the following description show merely some embodiments of the present disclosure, and a person of ordinary skill in the art may still derive other drawings according to these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the embodiments to be described are merely a part rather than all of the embodiments of the present disclosure. All other embodiments obtained by a person of ordinary skill in the art based on the embodiments of the present disclosure without creative efforts shall fall within the protection scope of the present disclosure.

Embodiments of the present disclosure provide a data packet transmission method and a related device and system, which may effectively reduce a data packet transmission delay caused by an RTT delay existing in a handshake process. Detailed descriptions are separately given in the following.

Figure 1:
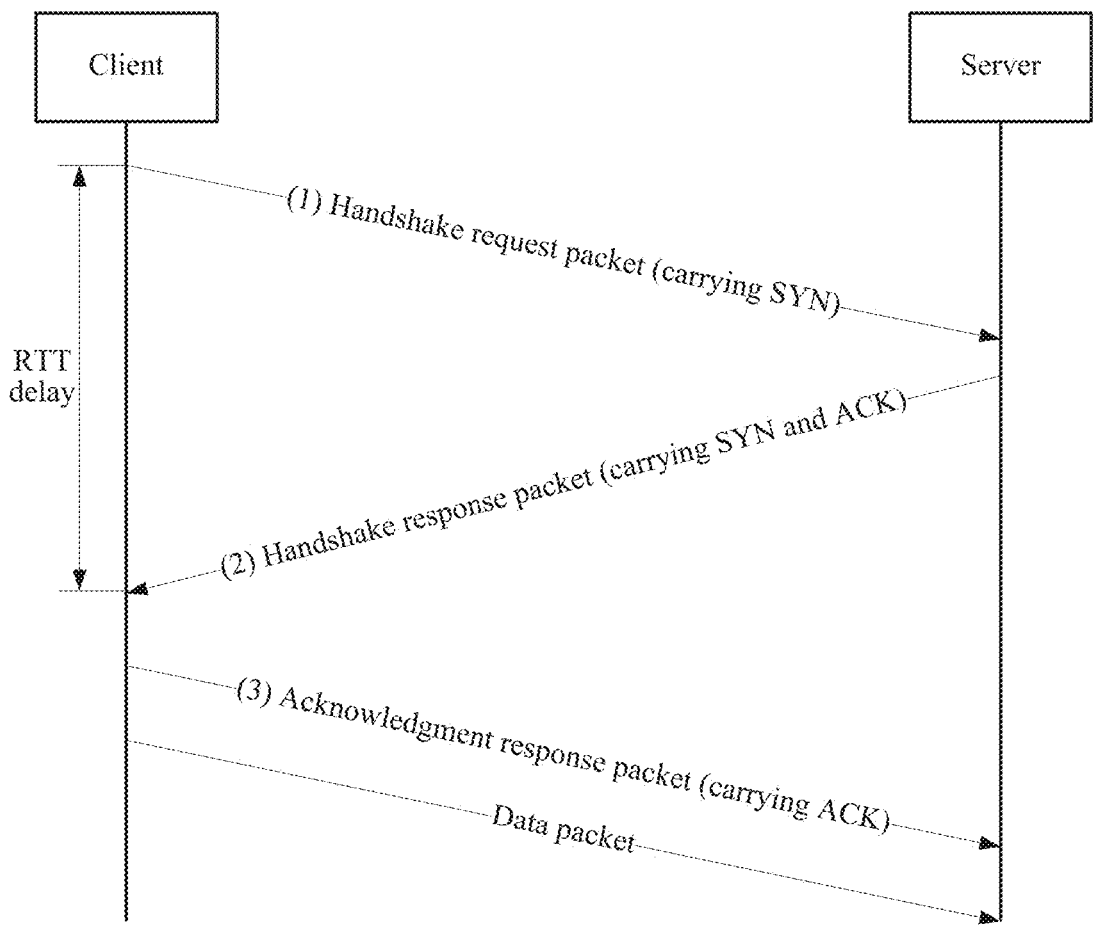
FIG. 1 is a schematic diagram of an existing TCP handshake process.
Figure 2:
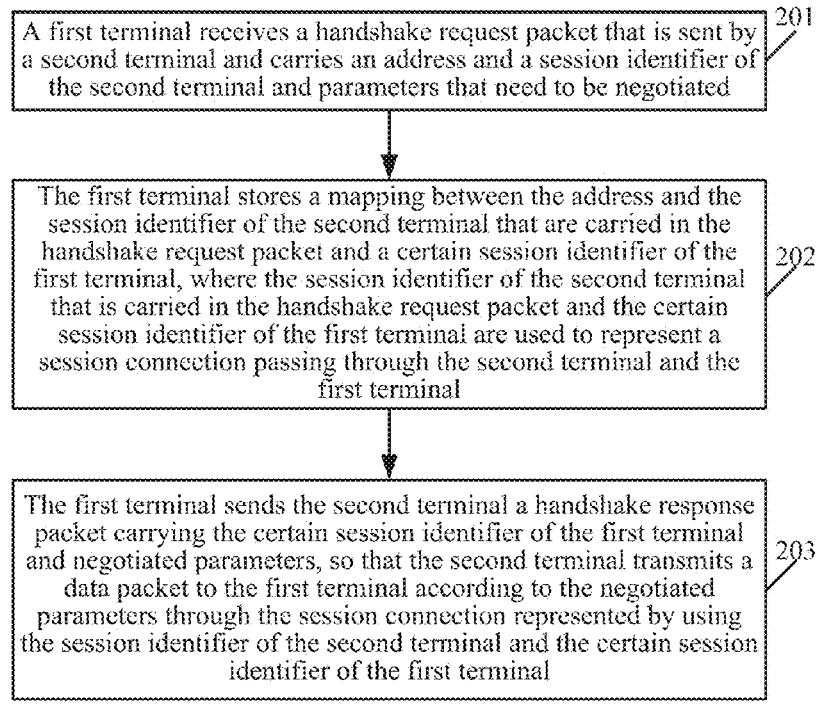
FIG. 2 is a flowchart of a data packet transmission method according to an embodiment of the present disclosure.

Referring to FIG. 2, FIG. 2 is a flowchart of a data packet transmission method according to an embodiment of the present disclosure. As shown in FIG. 2, the data packet transmission method may include the following steps.

201. A first terminal receives a handshake request packet that is sent by a second terminal and carries an address and a session identifier of the second terminal and parameters that need to be negotiated.

The parameters that need to be negotiated and are carried in the handshake request packet sent by the second terminal may include parameters such as an ISN, an MSS, and a receive window size of the packet sent by the second terminal.

202. The first terminal stores a mapping between the address and the session identifier of the second terminal that are carried in the handshake request packet and a certain session identifier of the first terminal, where the session identifier of the second terminal that is carried in the handshake request packet and the certain session identifier of the first terminal are used to represent a session connection passing through the second terminal and the first terminal.

After receiving the handshake request packet that is sent by the second terminal and carries the address and the session identifier of the second terminal and the parameters that need to be negotiated, the first terminal may establish a new session connection passing through the second terminal and the first terminal, and allocate a certain session identifier of the first terminal to the session connection on the first terminal. The certain session identifier of the first terminal and the session identifier of the second terminal that is carried in the handshake request packet sent by the second terminal are used to represent the new session connection established through the second terminal and the first terminal.

A specific implementation process for the first terminal to establish a new session connection passing through the second terminal and the first terminal is common knowledge for a person skilled in the art, and therefore, no further details are provided in this embodiment of the present disclosure.

203. The first terminal sends the second terminal a handshake response packet carrying the certain session identifier of the first terminal and negotiated parameters, so that the second terminal transmits a data packet to the first terminal according to the negotiated parameters through the session connection represented by using the session identifier of the second terminal and the certain session identifier of the first terminal.

In this embodiment of the present disclosure, after the first terminal performs step 201 (for example, after step 201 and before step 203), the first terminal may receive the data packet transmitted by the second terminal, and query whether the mapping between the address and the session identifier of the second terminal that are carried in the data packet and the certain session identifier of the first terminal is stored. If the mapping is stored, the first terminal may transmit, through the session connection represented by using the session identifier of the second terminal and the certain session identifier of the first terminal, the data packet to an upper-layer device for processing.

In an embodiment, if the first terminal finds through querying that the mapping between the address and the session identifier of the second terminal that are carried in the data packet and the certain session identifier of the first terminal is not stored, the first terminal may first buffer the data packet transmitted by the second terminal.

In an embodiment, the first terminal may detect whether storage time of the mapping between the address and the session identifier of the second terminal that are carried in the handshake request packet and the certain session identifier of the first terminal exceeds preset longest handshake time, and if the storage time of the mapping exceeds the preset longest handshake time, delete the mapping whose storage time exceeds the preset longest handshake time and that is between the address and the session identifier of the second terminal that are carried in the handshake request packet and the certain session identifier of the first terminal.

In an embodiment, after receiving the handshake response packet of the first terminal, the second terminal may send the first terminal an acknowledgement response packet (a carried ACK is set to 1, indicating that the second terminal has received the handshake response packet of the first terminal), so as to complete a handshake process.

In the data packet transmission method described in FIG. 2, a traditional communication protocol (such as TCP) handshake process is optimized, so that data packet transmission may be implemented in the handshake process; and the data packet transmission does not depend on completion of the handshake, thereby effectively reducing a data packet transmission delay caused by an RTT delay existing in the handshake process.

Figure 3:
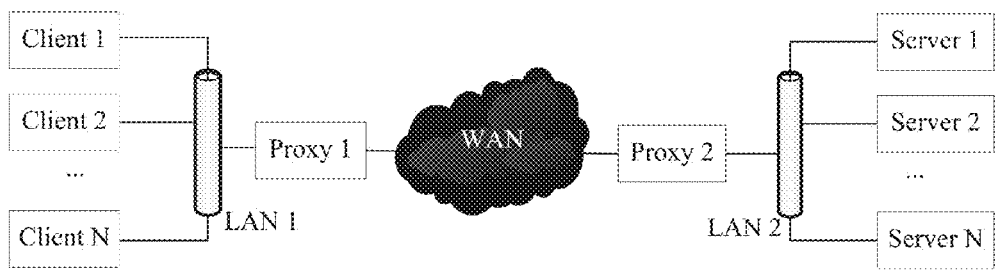
FIG. 3 is a schematic diagram of a network model in which a client accesses a data center according to an embodiment of the present disclosure.

The data packet transmission method provided in the present disclosure applies to an interaction scenario in which a network delay is relatively long and a user has a certain requirement for real-timeliness, for example, a common interaction scenario that a long distance, such as a WAN or a satellite link, is spanned. Such interaction scenario may be an interaction between servers, may be an interaction between a server and a client, and may also be an interaction between clients. As shown in FIG. 3, that a client spans a WAN to access a server is taken as an example. The present disclosure applies to a scenario in which each of two ends of the WAN is deployed with a proxy (that is, a Proxy 1 and a Proxy 2 in FIG. 3). In a general case, a proxy (that is, the Proxy 1) may be deployed on a client side (that is, a Client 1 to a Client N) and used for network sharing and security and right control, and so on; and a proxy (the Proxy 2) may also be deployed on a server side (a Server 1 to a Server N). The Proxy 2 is also called a reverse proxy and is used for load balancing between servers, security control, and so on. The Proxy 1 and clients (that is, the Client 1 to the Client N) are generally in a same local area network (a LAN 1), and the Proxy 2 and servers (the Server 1 to the Server N) are generally in a same local area network (a LAN 2).

Figure 4:
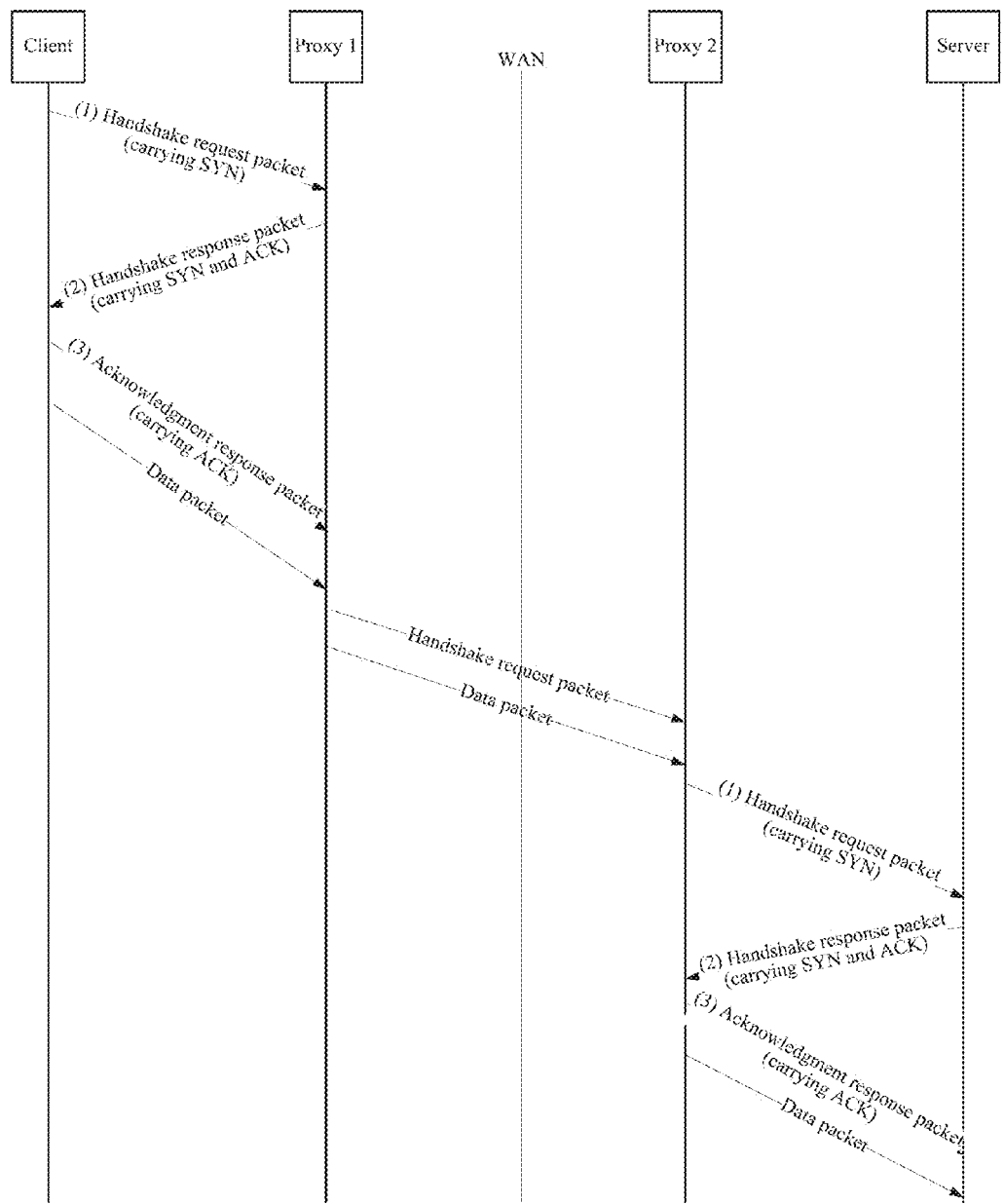
FIG. 4 is a schematic diagram of a handshake process of the network model shown in FIG. 3.

A handshake process of a network model shown in FIG. 3 is shown in FIG. 4. A traditional TCP handshake process is used between a client and the Proxy 1 and between the Proxy 2 and a server, and an optimized handshake process of the present disclosure is used between the Proxy 1 and the Proxy 2. That is, an original TCP handshake process from the client to the server is divided into three parts: a TCP handshake between the client and the Proxy 1, an optimized handshake between the Proxy 1 and the Proxy 2, and a TCP handshake between the Proxy 2 and the server. Because the Proxy 1 is connected to the Proxy 2 through the WAN, a delay is the longest. Therefore, the handshake between the Proxy 1 and the Proxy 2 is optimized, so that the Proxy 1 may start to transmit a data packet to the Proxy 2 after sending a handshake request packet to the Proxy 2, thereby effectively reducing a data packet transmission delay caused by an RTT delay in the handshake process. Meanwhile, a standard TCP handshake is still used between the client and the server, thereby ensuring compatibility. The optimized handshake between the Proxy 1 and the Proxy 2 may be implemented by adopting a connectionless user datagram protocol (User Datagram Protocol, UDP), and may also be implemented by adopting a connection-oriented TCP.

Figure 5:
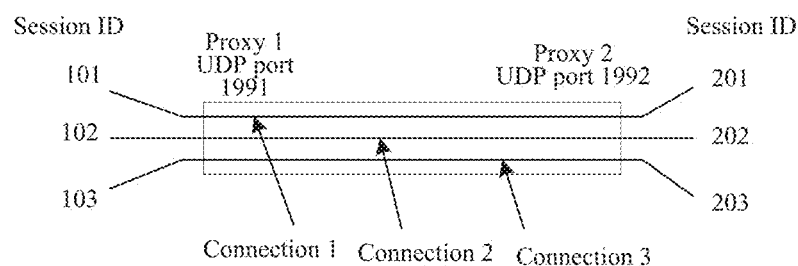
FIG. 5 is a schematic diagram of a UDP-based session connection model between a Proxy 1 and a Proxy 2 in an optimization process for implementing a handshake between the Proxy 1 and the Proxy 2 by adopting a connectionless UDP.

In an optimization process for implementing a handshake between a Proxy 1 and a Proxy 2 by adopting a connectionless UDP, a UDP-based session connection model between the Proxy 1 and the Proxy 2 is shown in FIG. 5. A UDP port (for example, 1991) is enabled on the Proxy 1, and a UDP port (for example, 1992; port selection may be adjusted as required, and multiple pairs of ports may also be adopted) is also enabled on the Proxy 2. Because the UDP is connectionless, application-layer software is required to implement a connection-oriented function. The application-layer software may establish multiple session connections on this pair of UDP ports, and each session connection has a session identifier (ID) on the Proxy 1 and the Proxy 2 respectively, where the session identifier is used to represent the session connection. As shown in FIG. 5, for a session connection "connection 3" from the Proxy 1 to the Proxy 2, a session ID "103" of the Proxy 1 and a session ID "203" of the Proxy 2 may be adopted to represent the "connection 3". If the Proxy 1 needs to send a packet to the Proxy 2 through the "connection 3", the packet needs to indicate that a source port number is 1991 (that is, an address of the Proxy 1), a destination port number is 1992, and a destination session ID is 203. In this way, the Proxy 2 can receive the packet of the Proxy 1 on the "connection 3", and transmit the packet to an upper-layer device (any one of the Server 1 to the Server N) for processing.

Based on the foregoing description, in the optimization process for implementing the handshake between the Proxy 1 and the Proxy 2 by adopting the connectionless UDP, a data packet transmission process includes the following steps:

1. A Proxy 1 initiates a handshake request Handshake Request packet to a Proxy 2, where the handshake request packet carries an address (that is, a port with a port number 1991) and a session ID (assumed to be an ID1) of the Proxy 1, and parameters of the Proxy 1 that need to be negotiated, such as an ISN, an MSS, and a receive window size, and the handshake request packet is sent to a port with a port number 1992 of the Proxy 2.

2. The Proxy 1 sends a data packet to the Proxy 2. In this case, because a session of the Proxy 2 has not been established (or has been established but not been notified to the Proxy 1), the Proxy 1 fills an invalid value (such as −1) in a session ID of the Proxy 2. Both the ISN and the MSS that are carried in the data packet use values in step 1. Before establishment of a connection is completed, an accumulated size of packets sent by the Proxy 1 should not exceed a default receive window size of the Proxy 1, so as to prevent a buffer overflow on a peer end (Here, it is considered that a receive window size of the Proxy 2 is the same as the receive window size of the Proxy 1).

3. After receiving the handshake request packet, the Proxy 2 establishes a new session connection passing through the Proxy 2 and the Proxy 1, allocates a session ID, an ID2, to this session connection on the Proxy 2, and meanwhile, stores a mapping between the address and the session ID (ID1) of the Proxy 1 and the session ID (ID2) of the Proxy 2.

4. The Proxy 2 sends a handshake response Handshake Response packet to the Proxy 1, where the handshake response packet carries the session ID (ID2) of the Proxy 2 and negotiated parameters such as the MSS and an ISN and a receive window size of the Proxy 2.

5. After receiving the data packet of the Proxy 1, the Proxy 2 finds that the destination session ID carried in the data packet is an invalid value, and queries, according to the address and the session ID (ID1) of the Proxy 1 that are carried in the data packet, whether the mapping between the address and the session ID (ID1) of the Proxy 1 that are carried in the data packet and the session ID (ID2) of the Proxy 2 is stored, and if the mapping is stored, transmits, through the session connection represented by using the session ID (ID1) of the Proxy 1 and the session ID (ID2) of the Proxy 2, the data packet to a server of the Proxy 2 for processing.

6. After receiving the handshake response packet, the Proxy 1 obtains the session ID (ID2) of the Proxy 2 and the parameters such as the ISN, the MSS, and the receive window size of the Proxy 2, and the handshake process is completed.

7. The Proxy 1 sends a data packet to the Proxy 2 by using the negotiated parameters such as the MSS and the receive window size, where a destination session ID of this data packet is the ID2.

8. The Proxy 2 periodically deletes a mapping whose storage time exceeds longest handshake time in step 3, so as to make more space for storing a new mapping.

Figure 6:
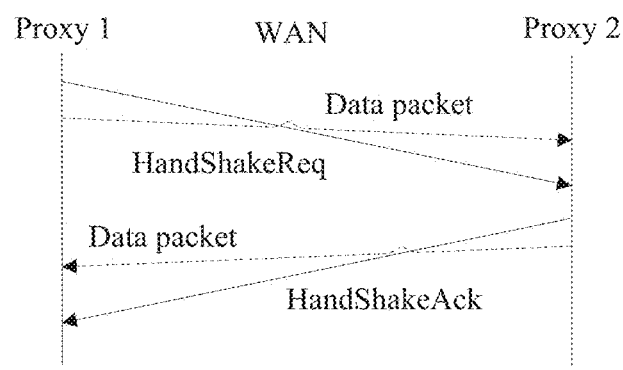
FIG. 6 is a schematic diagram of packet disorder in an optimization process for implementing a handshake between a Proxy 1 and a Proxy 2 by adopting a connectionless UDP.

In this embodiment of the present disclosure, different routes of packets in a network may cause packet disorder, and a case that a data packet arrives at the Proxy 2 earlier than a handshake request packet may occur, as shown in FIG. 6. In this embodiment of the present disclosure, a method for handling packet disorder is as follows:

(1) If a Proxy 2 first receives data packets, there is no session on the Proxy 2 in this case, and the Proxy 2 finds through querying that a mapping between an address and a session ID (ID2) of a Proxy 1 that are carried in the data packets and a certain session ID (ID1) of the Proxy 2 is not stored, the Proxy 2 may first buffer the data packets, performs the buffering according to the address and the session ID (ID2) of the Proxy 1 that are carried in the data packets, and meanwhile, performs sequencing according to buffering time.

(2) After receiving a handshake request packet, the Proxy 2 establishes a new session, and the Proxy 2 queries whether there are buffered data packets in the session, and if there are buffered data packets in the session, extracts the buffered data packets from a buffer for processing.

(3) A time to live needs to be set for the buffered data packets, and a data packet that is not extracted when the time to live expires needs to be released in time, so as to prevent occupation of too many resources.

(4) If the Proxy 1 first receives data packets transmitted by the Proxy 2, although a session is already established, there is no information, such as an ISN, of a corresponding session of the Proxy 2, the Proxy 1 still cannot perform normal processing on the data packets. In this case, the Proxy 1 also needs to buffer the data packets, and a processing mechanism is the same as that of the Proxy 2.

Figure 7:
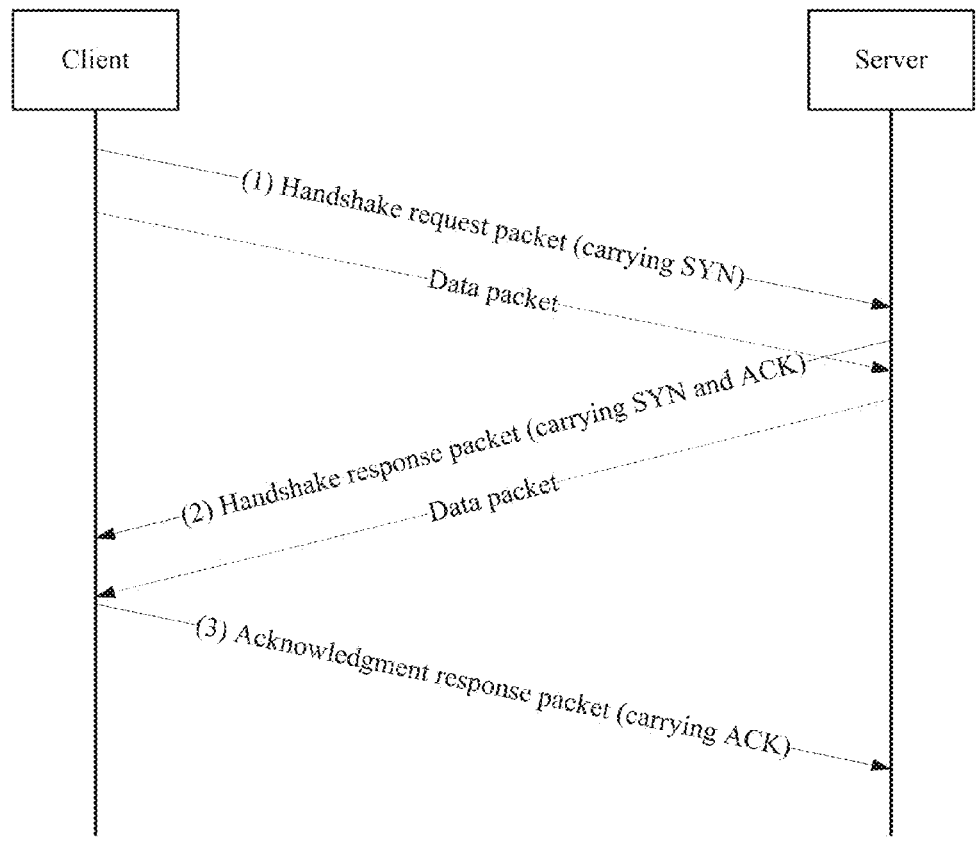
FIG. 7 is a schematic diagram of an optimization process of a TCP handshake according to an embodiment of the present disclosure.

In an optimization process for implementing a handshake between a Proxy 1 and a Proxy 2 by adopting a TCP, the following several modifications need to be made to a TCP handshake process, so as to start data packet transmission in the TCP handshake process. After the modifications, an optimized handshake process is shown in FIG. 7, that is:

(1) After sending a handshake request packet, without waiting until an entire handshake process ends, a client uses a session connection to send a data packet. In this case, the client has not received a handshake response packet of a server and has no information such as an ISN of a packet sent by the server, and the client cannot receive a data packet from the server. (In fact, in this case, a session connection on the server has not been established, and the server does not send a data packet to the client.)

(2) After receiving the handshake request packet, the server establishes a new session connection and sends the client a handshake response packet (ISN, ACK) carrying a session ID of the server, and then the server may receive and send a data packet.

(3) After receiving the handshake response packet of the server, the client obtains the information such as the ISN of the packet sent by the server and may correctly process the data packet from the server.

In this embodiment of the present disclosure, when the client sends a packet, its connection state may still be ISN_SENT. In this case, TCP processing needs to be modified, so that a data packet may also be received and sent when a TCP connection in an ISN_SENT state. When the server receives and sends a packet, its connection state may still be ISN_RECV. In this case, TCP processing needs to be modified, so that the server may also receive and send a data packet when a TCP connection is in an ISN_RECV state.

In this embodiment of the present disclosure, in the optimization process for implementing the handshake between the Proxy 1 and the Proxy 2 by adopting the TCP, packet disorder may occur, and a handling method is the same as the method for handling packet disorder occurred in the optimization process for implementing the handshake between the Proxy 1 and the Proxy 2 by adopting the UDP. Therefore, no further details are provided in this embodiment of the present disclosure.

Figure 8:
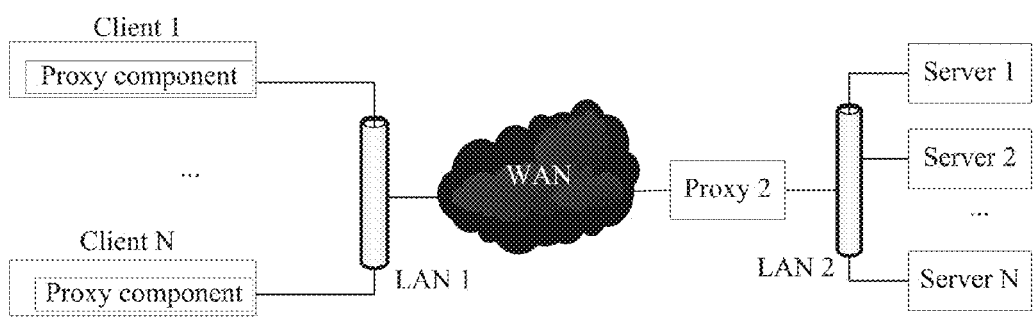
FIG. 8 shows a networking scenario to which a data packet transmission method applies according to an embodiment of the present disclosure.

A data packet transmission method provided in the present disclosure also applies to a networking scenario shown in FIG. 8. In the networking scenario shown in FIG. 8, according to considerations of service traffic and costs of a user, a Proxy 1 may not be a physical server, but may be installed on clients (a Client 1 to a Client N) as a component. Certainly, a Proxy 2 may also not be a physical server, but may be installed on servers (a Server 1 to a Server N) as a component. As shown in FIG. 8, the Proxy 1 is installed on a computer of a terminal user as a component (for example, as a browser plug-in or a process running separately). In this case, no dedicated physical server is required to run the Proxy 1.

Figure 9:
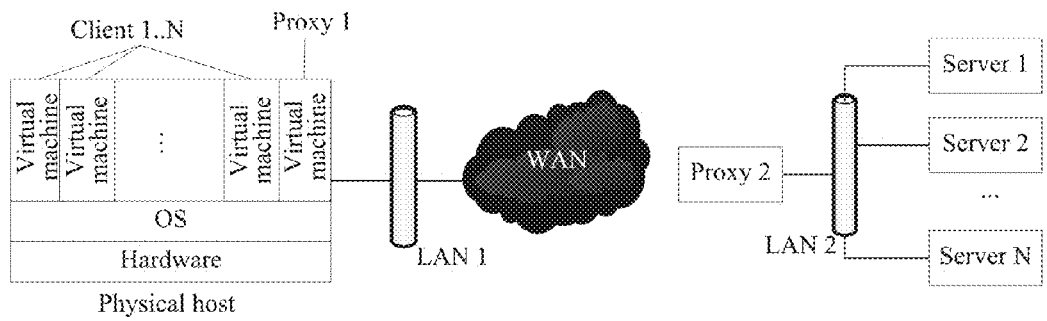
FIG. 9 shows another networking scenario to which a data packet transmission method applies according to an embodiment of the present disclosure.

A data packet transmission method provided in the present disclosure also applies to a networking scenario shown in FIG. 9. In the networking scenario shown in FIG. 9, a Proxy 1 may serve as a virtual machine and run on a same physical host (including hardware Hardware and an OS) as clients (a Client 1 to a Client N). In this case, no dedicated physical server is required to run the Proxy 1. Certainly, a Proxy 2 may also serve as a virtual machine and run on a same physical host as servers (a Server 1 to a Server N). In this case, no dedicated physical server is required to run the Proxy 2.

It can be seen that, in the data packet transmission method provided in this embodiment of the present disclosure, a traditional communication protocol (such as TCP) handshake process is optimized, so that data packet transmission may be implemented in the handshake process; and the data packet transmission does not depend on completion of the handshake, thereby effectively reducing a data packet transmission delay caused by an RTT delay existing in the handshake process. Practices show that, compared with a TCP, a delay may be reduced by 50% when a transmission amount of data packets is relatively small. When the data packet transmission method provided in this embodiment of the present disclosure is used in a scenario in which a network delay is long, its effect is more obvious.

Figure 10:
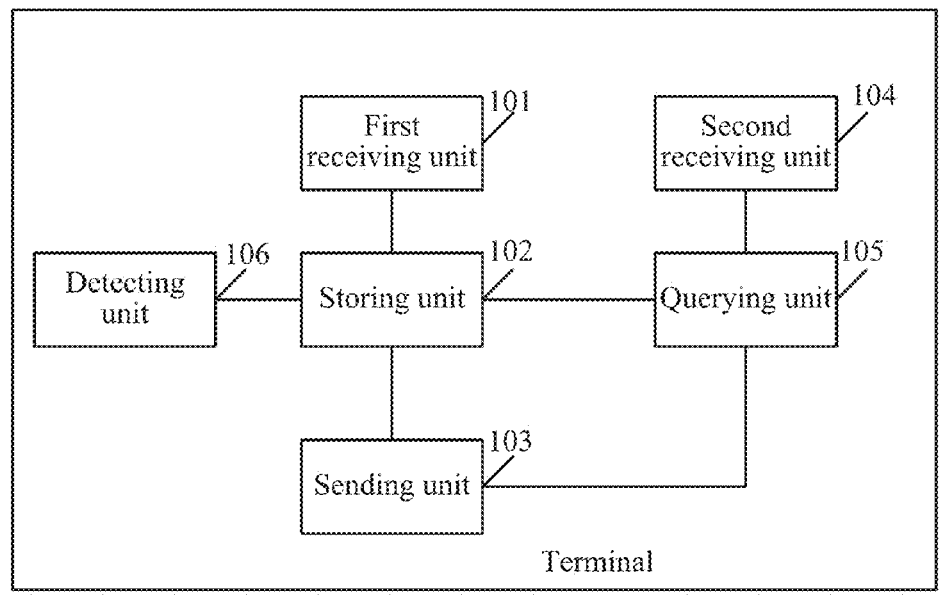
FIG. 10 is a schematic structural diagram of a terminal according to an embodiment of the present disclosure.

Referring to FIG. 10, FIG. 10 is a schematic structural diagram of a terminal according to an embodiment of the present disclosure. As shown in FIG. 10, the terminal includes:

a first receiving unit 101, configured to receive a handshake request packet that is sent by a second terminal and carries an address and a session ID of the second terminal and parameters that need to be negotiated;

a storing unit 102, configured to store a mapping between the address and the session ID of the second terminal that are carried in the handshake request packet and a certain session ID of the terminal, where the session ID of the second terminal that is carried in the handshake request packet and the certain session ID of the terminal are used to represent a session connection passing through the second terminal and the terminal; and a sending unit 103, configured to send the second terminal a handshake response packet carrying the certain session ID of the terminal and negotiated parameters, so that the second terminal transmits a data packet to the terminal according to the negotiated parameters through the session connection represented by using the session ID of the second terminal and the certain session ID of the terminal.

In an embodiment, the terminal shown in FIG. 10 further includes:

a second receiving unit 104, configured to receive the data packet transmitted by the second terminal; and a querying unit 105, configured to query whether the storing unit 102 stores the mapping between the address and the session ID of the second terminal that are carried in the data packet and the certain session ID of the terminal; where:

the sending unit 103 is further configured to, when a query result of the querying unit 105 is yes, transmit, through the session connection represented by using the session identifier of the second terminal and the certain session identifier of the terminal, the data packet to an upper-layer device for processing.

In an embodiment, the storing unit 102 is further configured to, when the query result of the querying unit 105 is no, buffer the data packet transmitted by the second terminal.

In an embodiment, the terminal shown in FIG. 10 further includes:

a detecting unit 106, configured to detect whether storage time of the mapping that is stored by the storing unit 102 and is between the address and the session ID of the second terminal that are carried in the handshake request packet and the certain session ID of the terminal exceeds preset longest handshake time, and if the storage time of the mapping exceeds the preset longest handshake time, delete the mapping whose storage time exceeds the preset longest handshake time and that is between the address and the session ID of the second terminal that are carried in the handshake request packet and the certain session ID of the terminal.

It can be seen that, in the terminal provided in FIG. 10, a traditional communication protocol (such as TCP) handshake process is optimized, so that data packet transmission may be implemented in the handshake process; and the data packet transmission does not depend on completion of the handshake, thereby effectively reducing a data packet transmission delay caused by an RTT delay existing in the handshake process.

Figure 11:
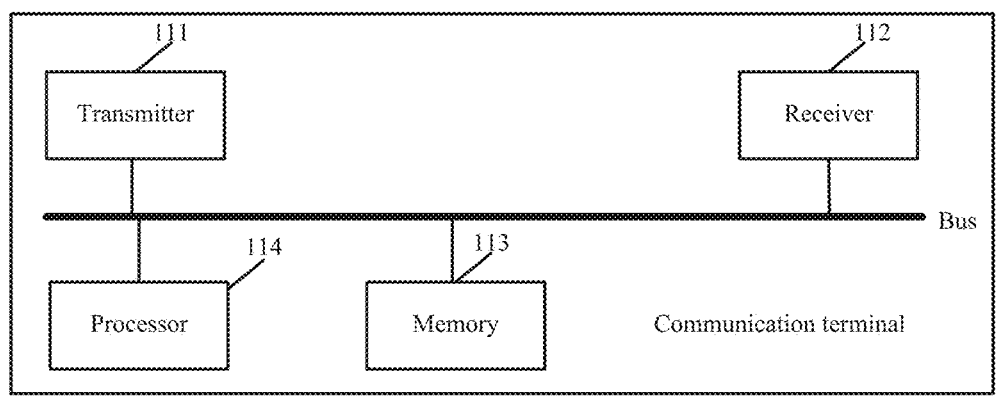
FIG. 11 is a schematic structural diagram of another terminal according to an embodiment of the present disclosure.

Referring to FIG. 11, FIG. 11 is a schematic structural diagram of another terminal according to an embodiment of the present disclosure. As shown in FIG. 11, the terminal includes a transmitter 111, a receiver 112, a memory 113, and a processor 114 connecting (such as connecting through a bus) to the transmitter 111, the receiver 112, and the memory 113, where the memory 113 stores a set of program codes, and the processor 114 is configured to call the program codes stored in the memory 113 to perform the following operations:

receiving a handshake request packet that is sent by a second terminal and carries an address and a session ID of the second terminal and parameters that need to be negotiated;

storing a mapping between the address and the session ID of the second terminal that are carried in the handshake request packet and a certain session ID of the terminal, where the session ID of the second terminal that is carried in the handshake request packet and the certain session ID of the terminal are used to represent a session connection passing through the second terminal and the terminal; and sending the second terminal a handshake response packet carrying the certain session ID of the terminal and negotiated parameters, so that the second terminal transmits a data packet to the terminal according to the negotiated parameters through the session connection represented by using the session ID of the second terminal and the certain session ID of the terminal.

In an embodiment, the processor 114 further performs the following operations:

receiving the data packet transmitted by the second terminal, and querying whether the mapping between the address and the session ID of the second terminal that are carried in the data packet and the certain session ID of the terminal is stored; and if the mapping is stored, transmitting, through the session connection represented by using the session identifier of the second terminal and the certain session identifier of the terminal, the data packet to an upper-layer device for processing.

In an embodiment, the processor 114 further performs the following operation:

if it is found through querying that the mapping between the address and the session ID of the second terminal that are carried in the data packet and the certain session identifier of the terminal is not stored, buffering the data packet transmitted by the second terminal.

In an embodiment, the processor 114 further performs the following operations:

detecting whether storage time of the mapping between the address and the session ID of the second terminal that are carried in the handshake request packet and the certain session identifier of the terminal exceeds preset longest handshake time, and if the storage time of the mapping exceeds the preset longest handshake time, deleting the mapping whose storage time exceeds the preset longest handshake time and that is between the address and the session ID of the second terminal that are carried in the handshake request packet and the certain session ID of the terminal.

It can be seen that, in the terminal provided in FIG. 11, a traditional communication protocol (such as TCP) handshake process is optimized, so that data packet transmission may be implemented in the handshake process; and the data packet transmission does not depend on completion of the handshake, thereby effectively reducing a data packet transmission delay caused by an RTT delay existing in the handshake process.

Figure 12:
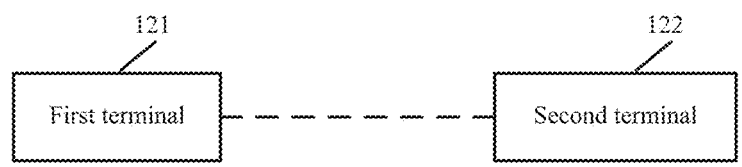
FIG. 12 is a schematic structural diagram of a data packet transmission system according to an embodiment of the present disclosure.

Referring to FIG. 12, FIG. 12 is a schematic structural diagram of a data packet transmission system according to an embodiment of the present disclosure. As shown in FIG. 12, the system includes a first terminal 121 and a second terminal 122, and the dashed line indicates a wireless connection.

The first terminal 121 is configured to receive a handshake request packet that is sent by the second terminal 122 and carries an address and a session ID of the second terminal 122 and parameters that need to be negotiated, and store a mapping between the address and the session ID of the second terminal 122 that are carried in the handshake request packet and a certain session ID of the first terminal 121, where the session ID of the second terminal 122 that is carried in the handshake request packet and the certain session ID of the first terminal 121 are used to represent a session connection passing through the second terminal 122 and the first terminal 121; send the second terminal 122 a handshake response packet carrying the certain session ID of the first terminal 121 and negotiated parameters; and receive a data packet transmitted by the second terminal 122 through the session connection represented by using the session ID of the second terminal 122 and the certain session ID of the first terminal 121.

The second terminal 122 is configured to send the first terminal 121 the handshake request packet carrying the address and the session ID of the second terminal 122 and the parameters that need to be negotiated, receive the handshake response packet that is sent by the first terminal 121 and carries the certain session ID of the first terminal 121 and the negotiated parameters, and transmit the data packet to the first terminal 121 according to the negotiated parameters through the session connection represented by using the session ID of the second terminal 122 and the certain session ID of the first terminal 121.

In an embodiment, the second terminal is further configured to send the first terminal 121 a data packet carrying the address and the session ID of the second terminal 122; and the first terminal 121 is further configured to receive the data packet transmitted by the second terminal 122, query whether the mapping between the address and the session ID of the second terminal 122 that are carried in the data packet and the certain session ID of the first terminal 121 is stored, and if the mapping is stored, transmit, through the session connection represented by using the session ID of the second terminal 122 and the certain session ID of the first terminal 121, the data packet to an upper-layer device for processing.

In an embodiment, the first terminal 121 is further configured to, when it is found through querying that the mapping between the address and the session ID of the second terminal 122 that are carried in the data packet and the certain session ID of the first terminal 121 is not stored, buffer the data packet transmitted by the second terminal 122.

In an embodiment, the first terminal 121 is further configured to detect whether storage time of the mapping between the address and the session ID of the second terminal 122 that are carried in the handshake request packet and the certain session ID of the first terminal 121 exceeds preset longest handshake time, and if the storage time of the mapping exceeds the preset longest handshake time, delete the mapping whose storage time exceeds the preset longest handshake time and that is between the address and the session ID of the second terminal 122 that are carried in the handshake request packet and the certain session ID of the first terminal 121.

It can be seen that, in the data packet transmission system provided in FIG. 12, a traditional communication protocol (such as TCP) handshake process is optimized, so that data packet transmission may be implemented in the handshake process; and the data packet transmission does not depend on completion of the handshake, thereby effectively reducing a data packet transmission delay caused by an RTT delay existing in the handshake process.

A person of ordinary skill in the art may understand that all or a part of the steps of the methods in the foregoing embodiments may be implemented by a program instructing relevant hardware. The program may be stored in a computer readable storage medium, and the storage medium may include: a flash drive, a read-only memory (Read-Only Memory, ROM), a random access memory (Random Access Memory, RAM), a magnetic disk, or an optical disk, or the like.

The data packet transmission method and the related device and system provided in the embodiments of the present disclosure are described in detail in the foregoing. Specific examples are used for illustrating principles and implementation manners of the present disclosure. The foregoing description of the embodiments is merely used to help understanding of the methods and core ideas of the present disclosure. Meanwhile, a person skilled in the art may make modifications to the specific implementation manners and application scopes according to the idea of the present disclosure. In conclusion, the content of this specification should not be construed as a limitation to the present disclosure.

What is claimed is:

1. A data packet transmission method, comprising:
receiving, by a first terminal, a handshake request packet for establishing a transport layer session connection that is sent by a second terminal, the handshake request packet carrying an address and a session identifier of the second terminal and parameters that need to be negotiated;
storing, by the first terminal, a mapping between the address and the session identifier of the second terminal that are carried in the handshake request packet and a certain session identifier of the first terminal, wherein the session identifier of the second terminal that is carried in the handshake request packet and the certain session identifier of the first terminal are used to represent the transport layer session connection passing through the second terminal and the first terminal;
sending, by the first terminal, a handshake response packet carrying the certain session identifier of the first terminal and negotiated parameters to the second terminal, in response to receiving the handshake request packet, so that the second terminal transmits a data packet to the first terminal according to the negotiated parameters through the transport layer session connection represented by using the session identifier of the second terminal and the certain session identifier of the first terminal, wherein the second terminal transmits the data packet to the first terminal in response to receiving the handshake response packet; and
detecting, by the first terminal, whether a storage time of the mapping between the address and the session identifier of the second terminal that are carried in the handshake request packet and the certain session identifier of the first terminal exceeds a preset longest handshake time, and in response to the storage time of the mapping exceeding the preset longest handshake time, deleting the mapping whose storage time exceeds the preset longest handshake time and that is between the address and the session identifier of the second terminal that are carried in the handshake request packet and the certain session identifier of the first terminal.

2. A terminal, comprising:
a receiver, configured to receive a handshake request packet for establishing a transport layer session connection that is sent by a second terminal, the handshake request packet carrying an address and a session identifier of the second terminal and parameters that need to be negotiated;
a memory, configured to store a mapping between the address and the session identifier of the second terminal that are carried in the handshake request packet and a certain session identifier of the terminal, wherein the session identifier of the second terminal that is carried in the handshake request packet and the certain session identifier of the terminal are used to represent the transport layer session connection passing through the second terminal and the terminal;
a transmitter, configured to send a handshake response packet carrying the certain session identifier of the terminal and negotiated parameters to the second terminal, in response to receiving the handshake request packet, so that the second terminal transmits a data packet to the terminal according to the negotiated parameters through the transport layer session connection represented by using the session identifier of the second terminal and the certain session identifier of the terminal, wherein the second terminal transmits the data packet to the terminal in response to receiving the handshake response packet; and
a processor, configured to detect whether storage time of the mapping between the address and the session identifier of the second terminal that are carried in the handshake request packet and the certain session identifier of the terminal exceeds a preset longest handshake time, and in response to the storage time of the mapping exceeding the preset longest handshake time, deleting the mapping whose storage time exceeds the preset longest handshake time and that is between the address and the session identifier of the second terminal that are carried in the handshake request packet and the certain session identifier of the terminal.

3. A terminal, comprising:
a memory configured to store a set of program codes; and
a processor coupled to the memory, wherein the processor is configured to call the program codes stored in the memory to perform the following operations:
receiving a handshake request packet for establishing a transport layer session connection that is sent by a second terminal, the handshake request packet carrying an address and a session identifier of the second terminal and parameters that need to be negotiated;
storing a mapping between the address and the session identifier of the second terminal that are carried in the handshake request packet and a certain session identifier of the terminal, wherein the session identifier of the second terminal that is carried in the handshake request packet and the certain session identifier of the terminal are used to represent the transport layer session connection passing through the second terminal and the terminal;
sending a handshake response packet carrying the certain session identifier of the terminal and negotiated parameters to the second terminal, in response to receiving the handshake request packet, so that the second terminal transmits a data packet to the terminal according to the negotiated parameters through the transport layer session connection represented by using the session identifier of the second terminal and the certain session identifier of the terminal, wherein the second terminal transmits the data packet to the terminal in response to receiving the handshake response packet; and
detecting whether storage time of the mapping between the address and the session identifier of the second terminal that are carried in the handshake request packet and the certain session identifier of the terminal exceeds a preset longest handshake time, and in response to the storage time of the mapping exceeding the preset longest handshake time, deleting the mapping whose storage time exceeds the preset longest handshake time and that is between the address and the session identifier of the second terminal that are carried in the handshake request packet and the certain session identifier of the terminal.

4. A data packet transmission system, comprising:
a first terminal; and
a second terminal;
wherein the first terminal is configured to:
receive a handshake request packet for establishing a transport layer session connection that is sent by the second terminal, the handshake request packet carrying an address and a session identifier of the second terminal and parameters that need to be negotiated;
store a mapping between the address and the session identifier of the second terminal that are carried in the handshake request packet and a certain session identifier of the first terminal, wherein the session identifier of the second terminal that is carried in the handshake request packet and the certain session identifier of the first terminal are used to represent the transport layer session connection passing through the second terminal and the first terminal;
send a handshake response packet carrying the certain session identifier of the first terminal and negotiated parameters to the second terminal in response to receiving the handshake response packet; and
receive a data packet transmitted by the second terminal through the transport layer session connection represented by using the session identifier of the second terminal and the certain session identifier of the first terminal;
wherein the second terminal is configured to:
send the first terminal the handshake request packet carrying the address and the session identifier of the second terminal and the parameters that need to be negotiated;
receive the handshake response packet that is sent by the first terminal and carries the certain session identifier of the first terminal and the negotiated parameters; and
transmit the data packet to the first terminal according to the negotiated parameters through the transport layer session connection represented by using the session identifier of the second terminal and the certain session identifier of the first terminal, wherein the second terminal transmits the data packet to the first terminal in response to receiving the handshake response packet; and
wherein the first terminal is further configured to:
detect whether storage time of the mapping between the address and the session identifier of the second terminal that are carried in the handshake request packet and the certain session identifier of the first terminal exceeds a preset longest handshake time, and in response to the storage time of the mapping exceeding the preset longest handshake time, delete the mapping whose storage time exceeds the preset longest handshake time and that is between the address and the session identifier of the second terminal that are carried in the handshake request packet and the certain session identifier of the first terminal.

* * * * *

UNITED STATES PATENT AND TRADEMARK OFFICE
CERTIFICATE OF CORRECTION

| | | |
|---|---|---|
| PATENT NO. | : 9,516,114 B2 | Page 1 of 1 |
| APPLICATION NO. | : 14/028183 | |
| DATED | : December 6, 2016 | |
| INVENTOR(S) | : Kebo Duan et al. | |

It is certified that error appears in the above-identified patent and that said Letters Patent is hereby corrected as shown below:

In Column 17, Line 9, Claim 3, delete "packetfor" and insert --packet for--.

Signed and Sealed this
Eighth Day of May, 2018

Andrei Iancu
*Director of the United States Patent and Trademark Office*